July 28, 1964 L. W. BAHE 3,142,594

RECTIFYING DEVICES

Filed Nov. 25, 1960

Inventor
Lowell W. Bahe
by Richard R. Mybeck
Attorney 3,142,594
Patented July 28, 1964

3,142,594

RECTIFYING DEVICES

Lowell W. Bahe, Milwaukee, Wis., assignor to Allis-Chalmers Manufacturing Company, Milwaukee, Wis.

Filed Nov. 25, 1960, Ser. No. 71,598
5 Claims. (Cl. 148—33.4)

Figure 1:
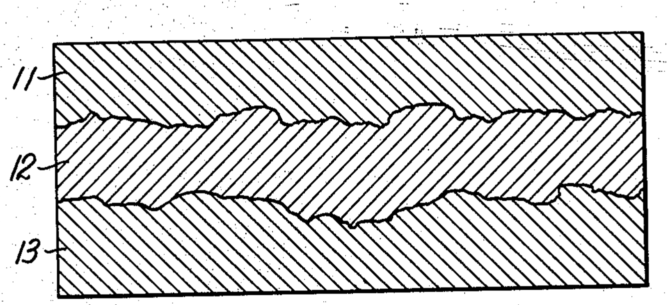

This invention relates generally to rectifying devices and more particularly to improved rectifying devices containing p-type and n-type oxidic semiconductor materials arranged in a unique manner and which have remarkable and totally unexpected rectification properties.

This application is a continuation-in-part of my copending application, Serial No. 679,505, filed August 21, 1957, now abandoned.

It is, of course, known that a rectifying device may be produced by two contiguous semiconducting oxides. Generally speaking, these devices are produced by abutting a p-type oxidic material with an n-type oxidic material along a common and contiguous border or interface. Usually the two oxidic layers are simply pressed together.

The present invention is predicated upon my discovery that a remarkably improved rectifier can be obtained when the rectifier avoids a simple contiguous interface between n-type and p-type semiconducting oxides and comprises instead an integral structure in which adjacent portions of the p-type and n-type semiconducting oxidic layers literally fuse one into the other to define a region of intermixture between strata formed by the nonreacted portions of the layers.

The present invention is further predicated upon my discovery that this fused region of intermixture, whether incorporated between two pure semiconducting oxides, between two additive-type semiconducting oxides, that is, oxides into which various preselected additives have been incorporated, or between a pure semiconducting oxide and an additive-type semiconducting oxide, provides a device having remarkably and unexpected enhanced properties of rectification.

A rectifying device containing semiconductive oxides must possess certain properties. For example, good electrical contact must be obtained between the semiconducting oxides if the rectifier is to perform in the desired fashion.

Furthermore, the relatively thin layers, which establish the zones of n-type and p-type conductivity, must be capable of withstanding appreciable mechanical and thermal stress.

Still further, the rectifying effect of the device should not be impaired by temperature changes so that the rectifier formed can be used under a variety of temperature conditions.

From a standpoint of economy, it is further desirable that the device be formed of materials which are relatively inexpensive and readily available.

Accordingly, one of the principal objects of the present invention is to provide an improved rectifying device which fulfills all of the aforestated desiderata.

Another object of the present invention is to provide an improved rectifying device in which the forward resistance is considerably reduced and the reverse resistance is considerably increased in comparison to rectifying devices containing contiguous line boundaries.

Still another object of the present invention is to provide an improved rectifying device in which a p-type semiconducting oxide and an n-type semiconducting oxide are connected by and to a region of intermixture disposed therebetween.

Figure 2:
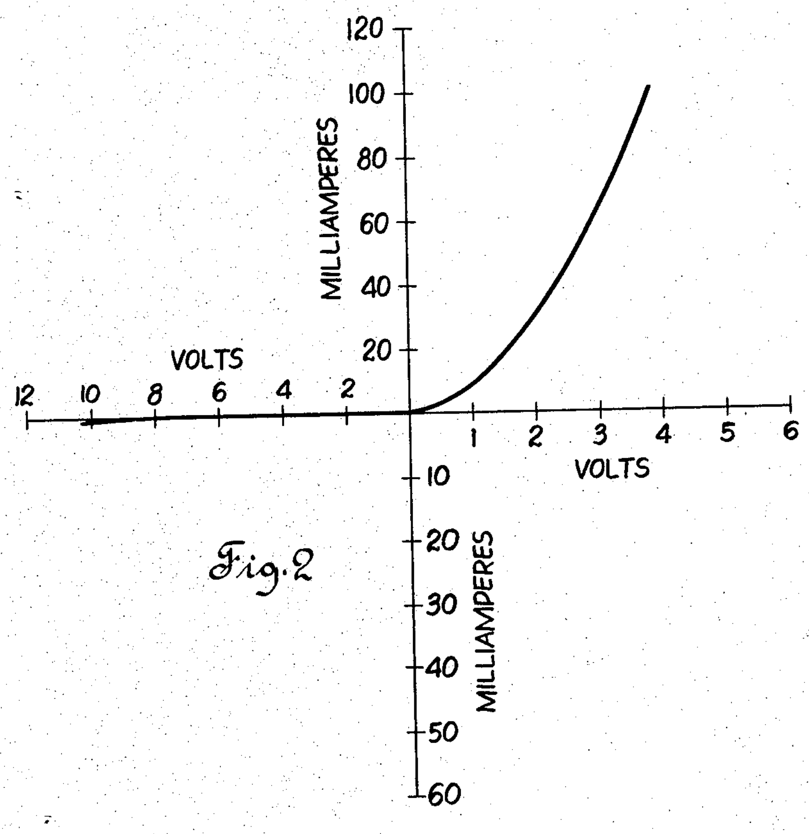

These and still further objects, as shall hereinafter appear, are fulfilled by the present invention in a remarkably unexpected fashion as may be discerned from the following detailed description of certain exemplary embodiments of the present invention, especially when considered in conjunction with the accompanying drawings in which:

FIG. 1 is a sectional view of a rectifying device embodying the present invention, the several regions having been exaggerated for purposes of illustration; and FIG. 2 is a curve of the static volt-milliampere characteristic of a rectifying device embodying the present invention.

Referring to FIG. 1, a rectifying device embodying the present invention comprises a layer 11 of an n-type semiconducting oxide, such for example as zinc (aluminum) oxide, integrally formed with a region of intermixture 12, hereinafter described in greater detail, which in turn is integrally formed with a layer 13 of a p-type semiconducting oxide such, for example, as nickel (lithium) oxide.

One method, by which the rectifying device illustrated in FIG. 1 may be manufactured, shall now be described:

A suitable metal supporting plate (not shown) is provided with a polished nickel surface. The supporting plate may be made either of pure nickel or any of the known electrical conductors which will take a nickel plate by electrodisposition, chemical deposition or like techniques. Thus, in the following description the term "nickel surface" shall be used to define both a surface of a supporting plate of pure nickel and a nickel plated surface on a supporting plate capable of being nickel plated.

The nickel surface of the supporting plate is then heated to a temperature of about 100 to 150° C. and the heated plate is sprayed with a mixture of lithium hydroxide and a volatile medium such as water. A mixture containing ten percent by weight lithium hydroxide gives good results. As this mixture is applied to the hot nickel surface, as with an atomizer, the volatile medium is evaporated and a thin uniform layer of lithium hydroxide is deposited over the nickel. A layer consisting of from about one to about five milligrams of lithium hydroxide for each square centimeter of surface area is preferred. The supporting plate with the lithium hydroxide coating is then heated in an air oven to a temperature of about 900 to 1100° C. for about ten minutes whereupon nickel oxide and lithium oxide are formed on the supporting plate as a single adherent layer of nickel (lithium) oxide having a blackish color and containing from about two to about ten mole percent of lithium oxide. The time of heating of course varies with the temperature selected although the formation of the blackish oxide is a reliable indication that the heating operation is complete.

Next, the nickel (lithium) oxide layer is brought to a temperature of about 100 to 150° C. and is sprayed with a mixture of finely ground zinc oxide and aluminum oxide in a volatile medium such as water. The mixture will contain about ten percent zinc (aluminum) oxide by weight. Again, the volatile medium is evaporated by the heat of the plate which is at a temperature slightly above the boiling temperature of the volatile medium. The spraying is continued until a substantially uniform layer, containing about two to about fifteen milligrams of zinc (aluminum) oxide for each square centimeter of sprayed surface area, is formed. The layer will contain from about one to about five mole percent of aluminum oxide.

Each of the layers measures about one to about five millimeters thick.

Next, portions of the zinc (aluminum) oxide and nickel (lithium) oxide layers adjacent each other are fused, one into the other, by heating the layers to a temperature of from 400 to 1100° C. whereupon a region of intermixture is formed disposed intermediate of those portions of the layers remote from the other layer. The time of heating is, of course, dependent upon the specific temperature selected. This heating may take place in air or a reducing atmosphere with equally satisfactory results.

Thus a rectifying device is formed which has three strata, namely, a p-type semiconductive oxide, a region of intermixture, and an n-type semiconductive oxide.

The region of intermixture is the result of a heat fusion which sees particles of the semiconductors literally migrate into each other to form, as in the instance described, a phase containing chemically $Zn(Al)O \cdot xNi(Li)O$.

It is of course understood that either or both of the p-type and n-type semiconductive strata may be formed of pure semiconductive oxides in which instance the additive would be omitted.

Regardless, the structure having the fused region of intermixture interposed between the semiconductive strata is found, without exception, to provide vastly improved rectification in comparison to the oxide rectifiers having a contiguous line interface only between the semiconductive materials.

In order to determine the electrical characteristics of the rectifying device having the nickel (lithium) oxide, intermixed region, and zinc (aluminum) oxide strata of the present invention, a static voltage is impressed across the device. Electrical connection is made in any well known fashion, the use of tungsten probes being found to give satisfactory results. Current readings (in milliamperes) are taken with an appropriate milliameter as the voltage is varied. The connections across the device are reversed to obtain the reverse current values. The results of these measurements for a typical rectifier of this invention, wherein the nickel and zinc oxides contain about 5 percent lithium oxide and 10 percent aluminum oxide respectively, are reported in FIG. 2. Voltage breakdown is also measured as by raising the potential in the reverse direction until failure occurs. Typical rectifying devices according to this invention are found to have a voltage breakdown at about 50 to 150 volts.

From the foregoing it becomes apparent that a novel and highly useful rectifying device has been described which significantly advances the art to which it pertains and fulfills all of the aforestated objectives in a remarkably unexpected fashion.

It is, of course, understood that the embodiment herein described and illustrated is intended to exemplify the present invention rather than limit it and that all modifications, alterations and applications falling within the spirit of this invention, especially as defined by the appended claims, are intended within its scope.

What is claimed is:

1. A rectifying device comprising a first layer of p-type semiconductive nickel oxide, a second layer of n-type semiconductive zinc oxide in spaced relationship to said first layer, and a region of intermixture of said oxides interposed between said first and said second layers and integral therewith.

2. A device according to claim 1 in which said n-type semiconductive zinc oxide contains from one to about five mole percent aluminum oxide.

3. A device according to claim 1 in which said p-type semiconductive nickel oxide contains about two to ten mole percent of lithium oxide.

4. A rectifying device comprising a first layer consisting of nickel (lithium) oxide, a second layer consisting of zinc (aluminum) oxide in spaced relationship to said first layer, and a region of intermixture consisting of nickel (lithium) oxide intermixed and fused with zinc (aluminum) oxide and interposed between said first and second layers and integral therewith.

5. A rectifying device comprising: a layer of nickel oxide having a thickness of from one to five millimeters and containing from about one to about ten mole percent of lithium oxide dispersed therethrough, a layer of zinc oxide having a thickness of from one to five millimeters and containing from about one to about five mole percent of aluminum oxide dispersed through, said last named layer being spaced from said first named layer, and a fused region of intermixture interposed between said layers and integral therewith.

References Cited in the file of this patent

UNITED STATES PATENTS

| | | |
|---|---|---|
| 2,622,116 | Maize | Dec. 16, 1952 |
| 2,749,489 | Mayer et al. | June 5, 1956 |
| 2,887,633 | Shilliday et al. | May 19, 1959 |

OTHER REFERENCES

Philips Research Reports No. 5, pages 173–187, dated 1950.

Physica, vol. XVII, No. 8, August 1951, pages 761–776.